May 2, 1944.  J. C. CROWLEY  2,348,110
TORCH
Filed June 16, 1939  2 Sheets-Sheet 1
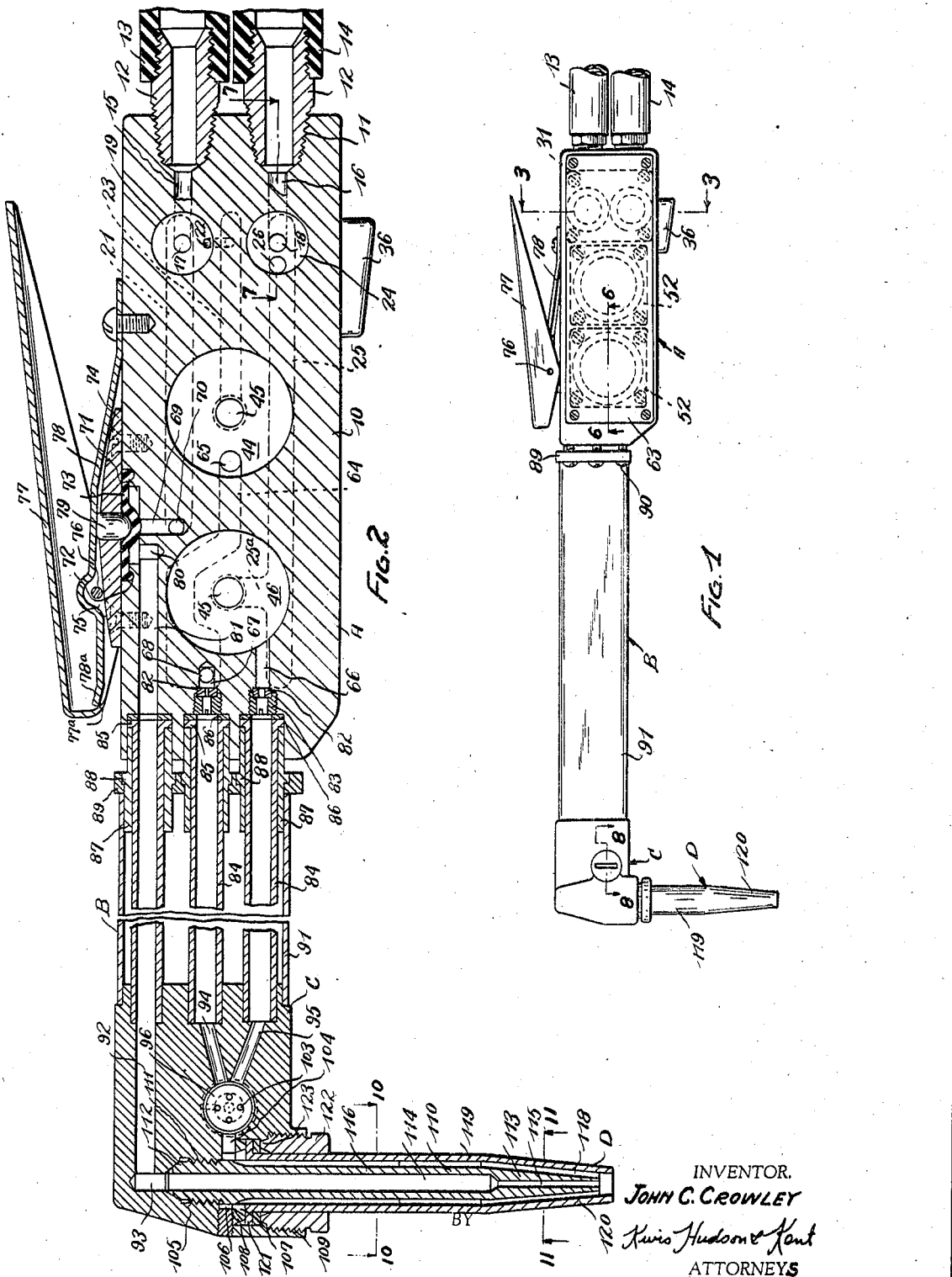
INVENTOR.
JOHN C. CROWLEY
BY
Kuris Hudson & Kent
ATTORNEYS May 2, 1944. J. C. CROWLEY 2,348,110
TORCH
Filed June 16, 1939 2 Sheets-Sheet 2

INVENTOR.
JOHN C. CROWLEY
BY
Kwis Hudson Kent
ATTORNEYS

Patented May 2, 1944

2,348,110

UNITED STATES PATENT OFFICE 2,348,110

TORCH

John C. Crowley, Cleveland Heights, Ohio, assignor to The Dill Manufacturing Company, Cleveland, Ohio, a corporation of Ohio Application June 16, 1939, Serial No. 279,499

2 Claims. (Cl. 158—27.4)

This invention relates to a cutting torch or blow pipe adapted for cutting or welding metal or for other similar purposes.

A cutting torch or blow pipe of the type to which the present invention relates is connected to a source of suitable inflammable gas under pressure and also to a source of oxygen under pressure, the gas and oxygen being suitably mixed in the torch to produce the required and correct combustible mixture. There is also provision in the torch for issuing therefrom a jet of high pressure oxygen that is not mixed with the inflammable gas. When a torch of this kind is used to cut metal the metal is first preheated by means of the flame produced at the nozzle of the torch by the ignited combustible mixture of gas and oxygen and after the metal has been sufficiently heated the jet of the high pressure oxygen unmixed with the inflammable gas is directed against the metal and acts to destroy the carbon in the metal and to effect a severing thereof. When the torch is used for the welding of metal it is necessary only to employ the flame of the ignited combustible mixture of oxygen and gas.

An object of the invention is to provide an improved and novel cutting torch or blow pipe which is so constructed as to be readily operated, require a minimum amount of attention on the part of the operator and which is extremely simple in construction.

Another object is to provide a cutting torch or blow pipe in which the handle is of improved construction and of such character and shape that it can be conveniently handled by the operator and has the gas and oxygen passages and the valve seats and valve chambers so located and so formed therein as to enable the handle to be efficiently and economically manufactured.

Another object is to provide a cutting torch or blow pipe wherein the manual control members for the valves controlling the admission of gas and oxygen to the low pressure passages of the torch and for the valve controlling the high pressure oxygen are conveniently arranged to promote efficient operation of the cutting torch or blow pipe by the operator.

More specifically an object of the invention is to provide in a cutting torch or blow pipe a handle wherein the valve controlling the passage of high pressure oxygen to the tip is located on the upper side of the handle intermediate the ends thereof, while the operating member for the valves that control the passage of low pressure oxygen and gas through the torch to the tip is located on the bottom or underside of the handle so that it can be operated conveniently by either a right-handed or a left-handed operator.

A still further object is to provide in a cutting torch or blow pipe an operating shaft for the valves that control the passage of low pressure gas and oxygen through the torch to the tip, which is so constructed that it operates both the valves and also acts to clamp the valves in closed position.

Another object is to provide an improved cutting torch or blow pipe wherein the handle and the valves mounted therein are so constructed that the same may be readily assembled and disassembled.

Another object is to provide a cutting torch or blow pipe wherein the tubes that conduct the high and low pressure oxygen and the inflammable gas from the handle to the mixing chamber may be readily clamped and sealed in the end of the handle in such manner as to be applicable to and removable from the handle as a unit.

A still further object is to provide a cutting torch or blow pipe wherein the head of the torch or blow pipe to which the tip is connected is provided with an improved mixing chamber.

A more specific object of the invention is to provide in the head of a cutting torch or blow pipe an improved mixing chamber for the low pressure gas and oxygen that can be closed by separate orifice plugs individually removable from the head from opposite sides thereof while a removable mixing member is arranged in the chamber and is provided with a baffle separating the inflowing low pressure gas and oxygen.

A still further object of the invention is to provide an improved tip for a cutting torch or blow pipe and which is so constructed that it may be readily assembled and the various parts thereof held in their proper relative positions.

Further and additional objects and advantages not hereinbefore referred to and including among other things simplicity of design, operation and assembly of the torch as a whole, as well as of the component parts thereof, will become more apparent hereinafter during the detailed description which is to follow of an embodiment of the invention. The embodiment of the invention to be described in detail herein is illustrated in the accompanying drawings wherein, Fig. 1 is an elevational view on a reduced scale of a cutting torch or blow pipe embodying the invention.

Fig. 2 is a longitudinal sectional view on a larger scale of the cutting torch or blow pipe shown in Fig. 1.

Figure 3:
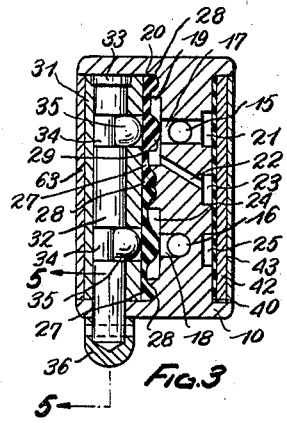
Fig. 3 is a transverse sectional view through the handle of the cutting torch or blow pipe and is taken substantially on line 3—3 of Fig. 1, looking in the direction of the arrows, the valves controlling the incoming gas and oxygen to the low pressure side of the cutting torch or blow pipe being shown in the open position.

The cutting torch or blow pipe shown in the drawings comprises a handle A and a tube or hand grip portion B connecting the handle A with the head C that has secured thereto the tip or nozzle D.

The handle A comprises a body 10 that is preferably rectangular in shape, as illustrated, to facilitate the handling of the cutting torch or blow pipe by the operator. The passages in the body 10 for the oxygen and inflammable gas are cored in the side of the body and are sealed by suitable sheet packing and a cover plate as will later be explained in detail, with the result that the body 10 constitutes in effect a manifold.

The rear end of the body 10 is provided with a pair of vertically spaced tapered threaded recesses 11, as viewed in the drawings, and these recesses have screwed therein suitable tapered fittings 12 that are connected to conduits 13 and 14 extending, respectively, to a source of oxygen under pressure and a source of inflammable gas under pressure.

Figure 4:
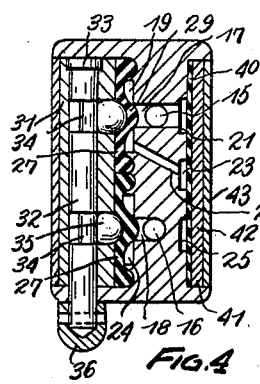
Fig. 4 is a view similar to Fig. 3 but shows the valves controlling the incoming gas and oxygen for the low pressure side of the cutting torch or blow pipe in closed position.
Figure 7:
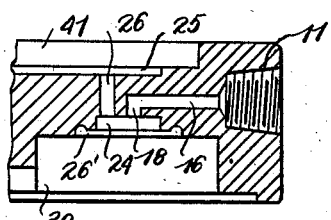
Fig. 7 is a fragmentary sectional view through that portion of the handle containing the manually operated control valve for the incoming inflammable gas and is taken substantially on line 7—7 of Fig. 2, looking in the direction of the arrows.

The body 10 adjacent its rear end, as viewed in Fig. 2, is provided with a pair of parallel vertically spaced longitudinally extending passages 15 and 16 which have one of their ends communicating with the recesses 11 and their opposite ends with short passages 17 and 18, respectively, that extend perpendicularly to the passages 15 and 16 in a direction transversely of the body 10, as clearly shown in Figs. 3, 4 and 7.

The passage 17 extends from the passage 15 laterally to both sides of the passage 15 and has its left hand end, as viewed in Figs. 3 and 4, communicating with a recess or counterbore 19, which, in turn, communicates with a larger counterbore 20 provided in its bottom wall adjacent its circumference with a concave annular groove in which a portion of a valve later to be described is located and clamped. The end of the passage 17 opposite to the counterbore 19 is in communication with an elongated cored groove or recess 21 that extends longitudinally of the body 10 and constitutes, when sealed by suitable packing, as will later be explained, a passage for the high pressure oxygen forming the cutting jet.

The counterbore 19 is connected to an elongated cored recess or groove 23 by means of a small passage 22 in the body 10 and extending from the counterbore 19 to said groove or recess 23, see Fig. 3. The groove or recess 23 when sealed by the packing above mentioned forms a passage that extends longitudinally in the body 10 in parallel relation to the passage 21 and is in communication with the automatic flow control valve for the low pressure oxygen as will later be explained.

The passage 18 places the passage 16 in communication with a counterbore or recess 24 similar to the counterbore or recess 19 and arranged in vertical alignment therewith, as clearly shown in Figs. 1, 2, 3 and 4. The counterbore 24 is in communication with an elongated cored groove or recess 25 by means of a passage 26 extending transversely of the body, as clearly shown in Figs. 2 and 7. The recess or groove 25 when sealed by the packing hereinbefore referred to constitutes a passage that extends longitudinally of the body 10 and in parallel relation to the passages 21 and 23, as clearly shown in Figs. 2, 3 and 4. The counterbore 24 terminates at its outer end in a counterbore 26', which is similar to the counterbore 20 previously referred to, and likewise provided in its bottom and adjacent its circumference with a concave annular groove.

Identical valves 27 are mounted in the counterbores or recesses 20 and 26' and these valves are in the form of flexible rubber discs provided on one side and adjacent their circumferences with annular beads 28 that fit into the concave annular grooves in the bottom wall of the counterbores or recesses 20 and 26', as clearly shown in Figs. 3 and 4. The valves 27 overlie the passages 17 and 18 and at their central point and on the same side thereof as the annular beads 28 are each provided with a convex knob 29 in line with said passages, and these knobs act as valves to close the passages 17 and 18 when the disks are distorted.

The body 10 is provided with a rectangular recess 30 extending from adjacent the top edge to adjacent the bottom edge of the body and centered over the counterbores 20 and 26'. A rectangular block 31, see Figs. 1, 3 and 4, is secured in the recess 30 by suitable securing means, such as screws or the like, and said block acts to clamp the flexible rubber disks forming the valves 27 in position, as clearly indicated in Figs. 3 and 4. The block 31 is provided centrally thereof with a vertically disposed bearing opening, as viewed in Figs. 3 and 4, in which is rotatably mounted a shaft 32 that has a flanged upper end 33 located in a counterbore concentric with the bearing opening in the block 31, wherefore said shaft 32 can rotate in said opening but is held against endwise movement therein by the flange 33 located in said counterbore and engaging with the underside of the handle body that overlies the recess 30.

The shaft 32 is provided intermediate its ends and in horizontal alignment, as viewed in Figs. 3 and 4, with the passages 17 and 18, with cam portions 34 that are in operative engagement with the flat sides of plungers 35 slidably mounted in vertically spaced openings formed in the block 31 and extending laterally of the bearing opening in said block. The plungers 35 have rounded ends that are in engagement with the valves 27 at the center thereof, wherefore when the shaft 32 is rotated in the proper direction the camming portions 34 will act to force the plungers 35 from the position shown in Fig. 3 to the position shown in Fig. 4, with the result that the rounded ends of the plungers flex or distort the valves 27 and force the knobs 29 thereof into the passages 17 and 18 and seal the same so that oxygen and gas cannot pass from said passages into the counterbores 19 and 24. The camming portions 34 serve to lock the valves in closed position until the shaft 32 is manually turned.

Figures 5, 6:
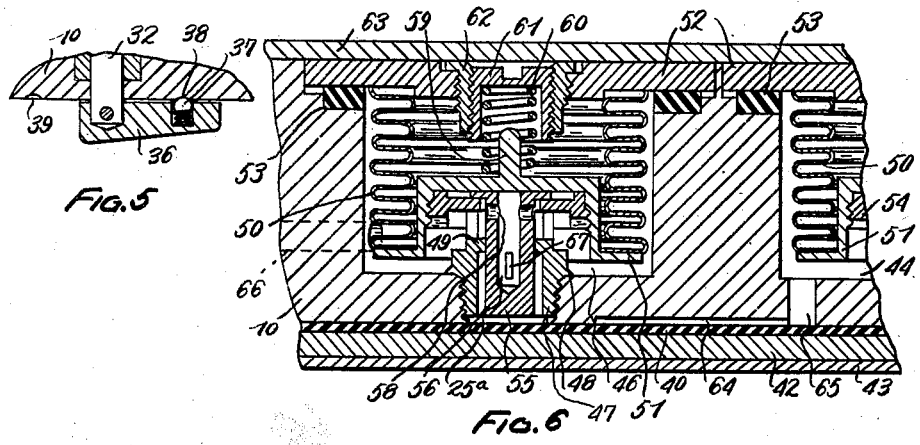
Fig. 5 is a fragmentary sectional view taken substantially on line 5—5 of Fig. 3, looking in the direction of the arrows.
Fig. 6 is a fragmentary sectional view of that portion of the handle wherein are located the automatic flow control mechanisms for the gas and oxygen and is taken substantially on line 6—6 of Fig. 1, looking in the direction of the arrows.

The operating shaft 32 extends through an opening in the handle body 10 to the underside of the handle and has secured thereto an operating member or lever 36, as clearly shown in Figs. 3, 4 and 5. The operating member or lever 36 is provided with a recess in which is located a spring-pressed detent ball 37 that cooperates with depressions 38 and 39 formed in the underside of the handle body 10 to hold the operating member or lever 36 and the shaft 32 in either one of two operative positions which, in this instance, represent rotative movement of the shaft 32 through 180°. Therefore it will be seen that the depressions 38 and 39 and the detent 37 form suitable spring points that maintain the parts in the proper positions when the valves are opened or closed. It will also be noted that the operating member or lever 36 being located beneath the handle A can be moved to either one of its two operative positions with equal facility by either a right or a left-handed operator.

The open sides of the recesses or grooves 21, 23 and 25, as well as other cored recesses or grooves formed in the side of the handle body 10, and later to be referred to, are closed and sealed to form passages by a suitable sheet packing 40 arranged in a recess 41 formed in the side of the handle body 10 and clamped in said recess by means of plates 42 and 43, see Figs. 3, 4 and 6, which plates are secured to the handle body 10 by suitable means such as securing screws.

The passage 23 extends centrally and longitudinally of the handle body 10 to beneath a circular recess 44 formed intermediate the ends of the body 10. The passage 23 is connected to the circular recess 44 by means of a threaded opening 45 located at the center of the bottom of the recess 44.

The passage 25 extends forwardly and longitudinally of the handle body 10 and is provided with a lateral off-set 25a that is in communication through a threaded opening with a circular recess 46 corresponding to the recess 44.

The recesses 44 and 46 are substantially identical and the automatic pressure responsive flow control mechanisms arranged in each recess are identical and act to automatically control the flow of the gas and oxygen to the head and tip of the cutting torch or blow pipe. Inasmuch as these mechanisms are identical it will only be necessary herein to describe one of the mechanisms.

As shown in the drawings, the recesses 44 and 46 are longitudinally spaced in the handle body 10 and have at their inner ends centrally arranged smaller internally threaded openings, such as the openings 45 which communicate with recesses 44 and 46 and the passages 23 and 25a respectively. Threaded bushings 47 are screwed into the small centrally located openings 45 and these bushings are provided with annular locating shoulders 48 which engage the inner or end walls of the recesses 44 and 46 when the bushings are properly positioned. The outer ends of the bushings 47, that is the upper ends thereof as viewed in Fig. 6, are provided with inwardly extending annular flanges 49 for a purpose which will later become clear.

Diaphragms or bellows 50 are mounted in the recesses 44 and 46 and these diaphragms or bellows have their inner ends secured to and closed by flanged cup-shaped members 51. The outer ends of the diaphragms or bellows 50 are closed by and secured to rectangular closure plates 52 mounted in recesses formed in the handle body 10 and secured in position by suitable means, such as screws or the like, see Figs. 1 and 6.

It will be noted that the handle body 10 is provided with suitable recesses to receive gaskets 53 that are engaged by the closure plates 52 and form an effective seal therewith to prevent the escape of gas or oxygen around the edges of the closure plates. The closure plates 52 are provided with central threaded openings for a purpose later to be explained.

The cup-shaped members 51 are internally threaded and have screwed therein clamping collars 54 which clamp in position the bases of valve posts 55 that extend into the bushings 47, as clearly indicated in Fig. 6. The valve posts 55 are provided with centrally located longitudinally extending bores 56, the inner ends of which are in communication with one or more radially extending preferably rectangular openings 57, while the outer ends are in communication with radially extending openings or passages 58. The bottoms of the cup members 51 are provided with centrally disposed outwardly extending projections 59 which receive one of the ends of coil springs 60 that abut against the cup members and have their opposite ends extending into and abutting against cup-shaped adjusting nuts 61, in turn, screwed into threaded bushings 62 mounted in the central openings in the closure plates 52. It will be seen that when it is desired to adjust the tension of the springs 60 it will be necessary merely to turn the adjusting nuts 61 in the proper direction to vary the tension of the springs in the amount desired.

It will be understood that the diaphragms or bellows 50 are merely of sufficient strength to remain extended under atmospheric pressure or substantially atmospheric pressure, and that the tension of the springs 60 is what determines the pressures at which the diaphragms or bellows move toward the collapsed or toward the expanded condition to effect a movement of the valve posts 55, that is, the diaphragms or bellows 50 merely act to stabilize the valve posts and to maintain the same in the fully opened position when not subjected to pressures above atmospheric pressure.

The oxygen and the inflammable gas flowing through the passages 23 and passages 25, 25a enter the bushings 47 and pass through the openings 57 in the valve posts 55 and thence through the bores 56 in the posts and the openings 58 into the recesses 45 and 46. The pressures of the incoming oxygen and gas act directly on the ends of the valve posts 55 and also the pressures of the oxygen and gas which have passed through the valve posts 55 into the recesses 44 and 46 act on the members 51 and the bellows 50. When the total pressure of the oxygen and the gas reaches a predetermined point the bellows or diaphragms start to collapse and the valve posts 55 and members 51 start to move against the action of the springs 60, whereupon the effective areas of the openings 57 in the posts will be gradually diminished by the openings passing across the annular flanges 49 of the bushings 47, it being understood that the valve posts 55 have a tight although working fit within the annular flanges 49.

In other words, the volume of oxygen or gas flowing into the recess 44 or the recess 46 is gradually diminished as the pressures of the incoming oxygen and gas increase, and thus the flow pressures of the oxygen and gas from the recesses 44 and 46 to the mixing chamber and the tip or nozzle of the cutting torch or blow pipe is controlled and maintained substantially constant. When the pressure of the incoming oxygen or gas becomes reduced the parts just enumerated move in the opposite direction under the action of the springs 60 to increase the effective area of the openings 57 in the valve posts and thus increase the volume of gas or oxygen flowing into the recess 44 or the recess 46 in inverse proportion to the decrease in the pressure of the incoming oxygen or gas.

It will be observed that the restrictions, later to be referred to, in the tip or nozzle D to the flow of the gas or oxygen serve to build up a back-pressure to which the members 51 are responsive, and this results in the volume of gas or oxygen flowing to the tip or nozzle always being proportional to the restriction in the tip or nozzle. In other words, the volume of oxygen or gas flowing to a tip or nozzle provided with relatively large orifices will be greater than the volume flowing to the tip or nozzle that is provided with relatively small orifices, although the flow pressure in each instance will remain the same or constant with respect to its setting.

It will be understood that when the valves 27 are first opened and oxygen and gas flows through the passages 21 and 25 to the recesses 44 and 46, the valve posts 55 are in the position indicated in Fig. 6, at which time the openings 57 present their maximum effective areas for the oxygen and gas to flow therethrough into the recesses 44 and 46. However, as soon as the pressure of the oxygen or gas in the recess 44 or recess 46 reaches a predetermined amount the volume of the oxygen or gas flowing through the valve posts 55 starts to be diminished, as has been stated, by the flanges 49 reducing the effective area of the openings 57. The flow pressure regulating means are so adjusted that the openings 57 will never be completely closed by the flanges 49, so that there is always oxygen or gas flowing through the valve posts into the recesses when the manually operated control valves 27 are opened. However, the effective area of the openings 57 will be changed in inverse proportion to changes in the pressures of the oxygen or gas, so that the volume of the oxygen or gas flowing into the recesses will be proportionately varied. In this way the flow pressures of the oxygen and gas through the recesses 44 and 46 are accurately regulated by means that does not function with pulsations but is smooth and gradual in its operation and provides at all times a continuous flow of oxygen or gas through the recesses 44 and 46 when the manually operated control valves 27 are open and insures a constant pressure flow to the tip or nozzle of the torch.

It will be understood that the springs 60 can be separately adjusted so that different flow pressures can be obtained by the regulating means and also that the openings 57 may be of the same or different sizes and can act as metering orifices according to the conditions which it is desired to obtain in the torch.

A closure plate 63 is secured to the side of the handle body 10 by suitable means, such as securing screws, and covers the block 31 and the closure plates or members 52, see Figs. 1, 3, 4 and 6.

The recess 44 is connected to a sealed cored recess or groove forming a passage 64 extending longitudinally of the body 10 by means of a short circular passage 65 extending from the bottom of the recess and perpendicularly to the passage 64. It will be noted that the passages 64 and 65 are in alignment with the passage 23 and that the passage 64, although provided with an off-set portion, is provided likewise with a portion parallel to the passages 21 and 23 and is closed and sealed by the gasket 40 and the closure plates 42 and 43. The recess 46 is in communication with a passage 66 extending longitudinally of the handle body 10 from adjacent the bottom of the recess 46 to adjacent the forward or left-hand end of the body. The passage 64 is in communication with a short bore 67 by means of a short passage 68 that extends perpendicularly to the passage 64 and bore 67, as clearly shown in Fig. 2.

The passage 21 for the high pressure oxygen, as already stated, extends longitudinally of the handle toward the left-hand end thereof, as viwed in the drawings, and communicates with a vertically extending bore 69 formed in the handle body 10 through the medium of a laterally extending passage 70, see Fig. 2. The bore 69 is in communication with a counterbore 71 formed in the upper side of the body 10 and concentric to the bore 69. A circular groove surrounds the counterbore 71 and is concentric thereto and receives the annular bead 72 on the underside of a flexible or rubber disk valve 73.

The valve 73 is clamped in position by means of a clamping plate 73 secured to the upper side of the handle by suitable securing means, such as screws, and this plate is provided with upstanding lugs 75 which receive the fulcrum pin 76 of an operating lever 77. A leaf spring 78 has one of its ends secured to the upper side of the handle body 10 by a suitable securing screw, as clearly shown in Fig. 2, and this spring extends into the operating lever 77 and has an angularly disposed end portion 78a which contacts with the inner side of an angularly disposed end portion 77a of the operating lever. The spring 78 intermediate its ends engages with the flat side of a plunger 79 that extends through an opening in the plate 74 and has a rounded inner end in contact with the disk valve 73 at the center thereof. The spring 78 acts to normally hold the plunger 79 in its innermost position and to force or distort the disk valve 73 into contact with the end of the bore 69 to close or seal the same as shown in Fig. 2. It will be understood, however, that when the operator depresses the right hand end of the lever 77, as viewed in Fig. 2, the angularly disposed portion 77a of said lever in contact with the angularly disposed portion 78a of the spring will raise said spring and relieve the plunger 79 of the pressure of the spring, whereupon the high pressure oxygen in the bore 69 will open the disk valve 73 and flow into the counterbore 71. The counterbore 71 is in communication by means of a vertically disposed passage 80 with a longitudinally disposed passage 81 formed in the handle body 10 and extending toward the left-hand end thereof, as viewed in the drawings.

The passages 66, 67 and 81 are in communication, respectively, with vertically spaced and aligned recesses formed in the left-hand end of the handle body 10, as viewed in Fig. 2, although it will be noted that interposed between said recesses and the passages 66 and 67 are packings 82 and threaded tubular members 83 which are located in reduced recesses concentric to the lower two of the three recesses in the left-hand end of the handle body 10 which have just been referred to. It will also be seen that the packings 82 are provided with openings which can differ in size and form metering orifices if so desired.

Similar tubes 84 extend into the three vertically spaced recesses in the left-hand end of the handle body 10 and have their ends provided with flanges 85 engaging suitable packing members 86 located in the inner ends of the recesses. Mounted on the tubes 84 are sleeves 87 that engage the flanges 85 and tightly fit the recesses in the handle body 10.

The sleeves 87 intermediate their ends are provided with annular ribs 88 which position the sleeves in vertically spaced openings formed in a bracket plate 89. The bracket plate 89 and the tubes 84 can be connected to or removed from the handle A as a unit, it being noted by reference to Fig. 1 that the bracket plate carries suitable connecting screws 90 which can be screwed into suitably tapped openings in the left-hand end of the handle body 10.

The tubes 84 extend toward the left, as viewed in the drawings, and have their left-hand ends seated in vertically spaced counterbores formed in the head C of the cutting torch or blow pipe. A suitably shaped closure and hand grip member 91 surrounds the tubes 84 and has its right-hand end contacting the bracket plate 89 and its left-hand end telescoping upon a reduced shoulder formed on the head C of the torch or blow pipe and thus the hand grip portion B and head C of the torch or blow pipe form a unit applicable to or removable from the handle A.

The uppermost tube 84 which conducts the high pressure oxygen from the passage 81 to the head is in communication with a passage 92 in the head C which, in turn, communicates with a short passage 93 arranged at right angles to the passage 92 and in communication with a counterbore in the head C, later to be referred to, and which counterbore receives the tip or nozzle.

The two lower tubes 84, as viewed in Fig. 2, and which are connected with the passages 66 and 67 communicate with the angularly disposed passages 94 and 95 in the head C and these passages 94 and 95 extend to the mixing chamber in the head C, which chamber is in the form of a circular opening 96 extending transversely of the head and threaded adjacent its middle portion, while its outer ends are conical in shape to receive the conical heads of separate orifice plugs 97 that are removably screwed into the opening 96 from opposite sides of the head.

Figure 8:
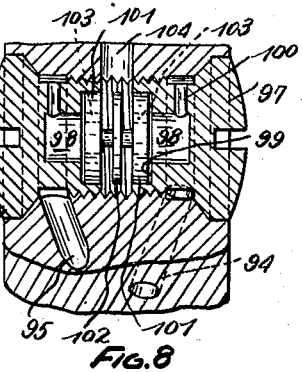
Fig. 8 is a detail sectional view of the head of the cutting torch or blow pipe and is taken through the mixing chamber thereof substantially on irregular line 8—8 of Fig. 1, looking in the direction of the arrows.

The plugs 97 are provided with bores 98 and counterbores 99 concentric thereto. The bores 98 are connected by passages 100 with the annular spaces between the outer periphery of the plugs 97 and the wall of the opening 96 intermediate the conical heads of the plugs and the threaded portions thereof, it being noted by reference to Fig. 8 that the passages 94 and 95 communicate with these spaces. A removable mixing member is mounted in the mixing chamber and comprises disks 101 located in the counterbores 99 of the removable plugs and supporting midway between themselves a baffle plate 102. The disks 101 are provided with a plurality of openings or ports 103 through which the gas and oxygen pass to the center of the mixing chamber. The gas and oxygen passing through the ports 103 to the center of the mixing chamber strikes the baffle 102 and a turbulence in the gas and oxygen is thus created in the mixing chamber to thoroughly mix the gas and oxygen which passes from the mixing chamber through a passage 104 in the head, as clearly shown in Figs. 2 and 8.

The passage 93 in the head C communicates with the conical or tapered upper end of a threaded bore 105 which, in turn, communicates at its lower end with a counterbore 106 that is in communication with the passage 104 from the mixing chamber. The counterbore 106, in turn, communicates with a larger counterbore 107 that is provided on its bottom wall with an annular V-shaped downwardly projecting rib 108. The counterbore 107 communicates with a larger downwardly facing threaded counterbore 109 and the bores and counterbores just referred to in the head C receive the inner and outer members of the tip or nozzle D, as well as the clamping nut which holds said members in assembled position in the head.

The tip or nozzle D includes an inner member 110 that is threaded exteriorly adjacent its upper end, as indicated at 111, to enable the inner member 110 to be screwed into the threaded counterbore 105 in the head and to have the conical upper end 112 of the inner member seat against the conical or tapered end of the counterbore 105, as clearly shown in Fig. 2. The inner member 110 is provided with a downwardly tapered lower end 113 and with a centrally disposed bore extending throughout the length of the member and composed of a portion 114 of relatively large diameter and communicating at its upper end with the passage 93 in the head and with a portion 115 located in the tapered lower end 113 of the member and of relatively small or restricted cross-sectional area.

The periphery of the inner member 110 above the tapered lower end of the member and below the threaded upper end thereof is of concave polygonal or hexagonal configuration, as indicated at 116 in Figs. 2 and 10, it being noted that the corners or angles 117 of the portion of the inner member that is of hexagonal cross-section are relatively sharp for a purpose later to be explained.

Figures 10, 11:
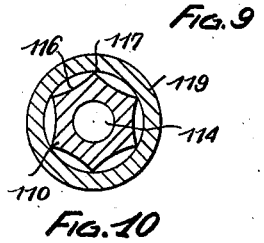
Fig. 10 is a detail sectional view through the tip or nozzle and is taken substantially on line 10—10 of Fig. 2, looking in the direction of the arrows.
Fig. 11 is a detail sectional view through the tip or nozzle and is taken substantially on line 11—11 of Fig. 2, looking in the direction of the arrows.

The tapered lower end 113 of the inner member is provided on its periphery with a plurality of longitudinally extending V-shaped grooves 118, as clearly indicated in Figs. 2 and 11. The outer or shell member 119 of the tip or nozzle is tubular in shape and is inwardly tapered adjacent its lower end, as indicated at 120, such tapered lower end 120 of the outer member extending slightly below the end of the tapered portion 113 of the inner member when the members are assembled in the head as clearly shown in Fig. 2.

The outer member 119 telescopes upon the inner member 110 and is provided at its upper end with an outwardly extending flange 121 located in the counterbore 107 of the head and in engagement with the sharp edge of the tapered rib 108 in said counterbore, as clearly shown in Fig. 2. The outer member 119 of the tip or nozzle is held in assembled position with respect to the inner member and the head C by means of an assembly or clamping nut 122 screwed into the threaded counterbore 109 of the headstock and having a tapered or pointed inner edge 123 engaging a packing gasket interposed between said edge and the underside of the flange 121 of the outer member.

It will be seen that the assembly nut 122 holds the flange 121 in tight engagement with the pointed edge of the tapered rib 108, and it should be understood that when the inner and outer members of the tip or nozzle are assembled the sharp corners 117 of the portion of the inner member that is of hexagonal cross-section embed themselves in the outer member or shell and prevent relative turning movement between the said members. It will also be understood that the concaved hexagonal cross-section 116 of the inner member provides longitudinally extending passages between the inner and outer members and these passages communicate at their upper ends with the counterbore 107 in the head which, in turn, is in communication with the counterbore 106 and at their lower ends with the V-shaped grooves 118 in the tapered end 113 of the inner member, such grooves constituting passages between the tapered end 113 of the inner member and the tapered end 120 of the outer or shell member.

The operation and mode of use of the cutting torch or blow pipe hereinbefore described will now be set forth in order to coordinate the various parts of the preceding description and to more clearly bring out the advantages inherent in a cutting torch or blow pipe embodying the invention.

Assuming that the two fittings 12 are connected by the conduits 13 and 14 to suitable sources of oxygen and inflammable gas under pressure, and that the torch is to be used for the cutting of metal, the operator first moves the operating member or lever 36 to rock the shaft 32 from the position shown in Fig. 4 to the position shown in Fig. 3 to effect opening movement of the valves 27. The oxygen is then free to flow from the passage 15 through the passage 17 into the counterbore 19, and thence through the passage 22 and passage 23 into the recess 44. The oxygen also flows from the passage 15 through the passage 17 into the longitudinally extending passage 21, but at this time the valve 73 is closed, as indicated in Fig. 2, and there is no flow of high pressure oxygen from the passage 69 to the passage 81. The inflammable gas is now free to flow from the passage 16 through the passage 18 into the counterbore 24 and thence through the passages 26, 25 and 25a to the recess 46.

It will be understood that the flow of oxygen and inflammable gas to the recesses 44 and 46, respectively, is controlled by the pressure responsive devices mounted in said recesses and clearly shown in Fig. 6 and hereinbefore described.

The oxygen flows from the recess 44 through the passages 65, 64, 68 and 67 to the middle tube 84, while the inflammable gas flows from the recess 46 through the passage 66 to the lower tube 84. The oxygen and gas flowing through said tube passes through the passages 94 and 95 in the head C to the mixing chamber and then the intermixed oxygen and gas flows through the passage 104 in the head, counterbores 106, 107 and passages 116 and 118 in the tip or nozzle to the lower end of the latter. The operator ignites the intermixed oxygen and gas emerging from the lower end of the tip or nozzle and which is in the form of a combustible mixture and uses this ignited mixture to heat the metal preparatory to the cutting operation.

It will be understood that the pressure responsive devices in the recesses 44 and 46 maintain the flow pressures of the oxygen and gas substantially constant, even though pressure changes may occur in the sources of supply of the oxygen or gas.

When the metal has been heated sufficiently for the cutting thereof the operator depresses the right-hand end of the lever 77 to raise the spring 78 and allow the high pressure oxygen to open the valve 73 and to flow through the counterbore 71, passages 80, 81, upper tube 84 to the passages 92 and 93 in the head, from whence it flows through the portions 114 and 115 of the bore through the inner member of the tip or nozzle and is emitted from the lower end of the nozzle in the form of a jet which strikes the heated metal along the line of the cut and destroys the carbon therein to effect a severing of the metal.

As soon as the operator releases the pressure of his hand on the lever 77 the spring 78 returns the lever to the position shown in Fig. 2 and forces the plunger 79 inwardly to distort the valve 73 to close the passage 69 and stop the flow of high pressure oxygen through the torch or blow pipe.

Of course where the torch or blow pipe is used merely for welding metal, it will not be necessary for the operator to manipulate the lever since no jet of high pressure oxygen is required in the welding operation but merely the flame of the intermixed low pressure oxygen and gas.

Figure 9:
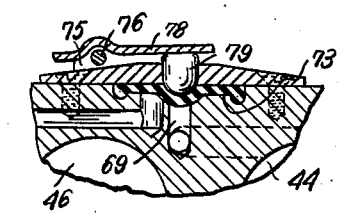
Fig. 9 is a fragmentary sectional view showing a slightly modified form of control valve for the high pressure oxygen than that shown in Fig. 2.

In Fig. 9 the valve arrangement for controlling the high pressure oxygen is slightly different in construction from that shown in Fig. 2. In Fig. 9 the end of the passage 69 where it communicates with the counterbore 71 is rounded, whereas in Fig. 2 it is formed with sharp corners. The arrangement shown in Fig. 9 may be more desirable as the flexible disk can be distorted into the passage 69 more uniformly.

From the foregoing description it will have been seen that the cutting torch or blow pipe embodying the invention is not only efficient in operation but can be readily manipulated or handled by the operator while the various parts of the torch or blow pipe are so designed from a manufacturing standpoint as to enable them to be economically produced and readily assembled and disassembled.

Although a preferred embodiment of the invention has been illustrated and described herein the invention is susceptible of various modifications and adaptations within the scope of the appended claims.

Having thus described my invention I claim:

1. In a torch of the character described a body having grooves in one side face of the body, a closure plate secured to said side face of the body and closing the said grooves to form fluid conducting passages for the preheating inflammable gas and the preheating oxygen, said body being provided in its other side face with recesses, fluid conducting passages in said body interconnecting said first passages and said recesses, fluid conducting passages in said body communicating with said recesses and adapted to be connected to a source of supply of inflammable gas and oxygen, valves located in said recesses for closing said last named fluid conducting passages, means carried by the body for closing the outer ends of said recesses and for securing said valves in said recesses, and valve actuating means carried by said means.

2. In a torch of the character described a body having a channel therein along one side face of the body and a recess therein at the other side face of the body, said body having a passage communicating with said recess, a valve in said recess for closing said second passage and interrupting communication between said second passage and said channel through said recess and said first passage, and plates secured to said sides of the body and closing the outer end of said recess and the outer side of said channel to form with the latter a passage for a preheating fluid.

JOHN C. CROWLEY.